United States Patent [19]

Kim

[11] Patent Number: 5,245,439
[45] Date of Patent: Sep. 14, 1993

[54] DEVICE AND METHOD IN A VIDEO RECORDER FOR CONTROLLING FREQUENCY CHARACTERISTICS OF A LUMINANCE COMPONENT IN DEPENDENCE UPON EXISTENCE OF A CHROMINANCE COMPONENT

[75] Inventor: Cheol-min Kim, Anyang, Rep. of Korea

[73] Assignee: SamSung Electronics Co., Ltd., Suwon, Rep. of Korea

[21] Appl. No.: 636,397

[22] Filed: Dec. 31, 1990

[30] Foreign Application Priority Data

Dec. 31, 1989 [KR] Rep. of Korea ............ 89-21324

[51] Int. Cl.$^5$ ............................................. H04N 9/80
[52] U.S. Cl. ........................................................ 358/316
[58] Field of Search ............. 358/316, 317, 330, 315, 358/318, 908, 26, 38

[56] References Cited

U.S. PATENT DOCUMENTS

| | | | |
|---|---|---|---|
| 4,068,257 | 1/1978 | Hirota et al. | 358/316 |
| 4,077,047 | 2/1978 | Yamagiwa | 358/317 |
| 4,430,674 | 2/1984 | Taguchi et al. | 358/317 |
| 4,524,380 | 6/1985 | Shibata et al. | 358/316 |
| 4,796,101 | 1/1989 | Kupfer | 358/330 |

Primary Examiner—Donald E. McElheny, Jr.
Attorney, Agent, or Firm—Robert E. Bushnell

[57] ABSTRACT

A circuit for recording video signals includes: a luminance signal processor for separating a luminance signal from a video signal and frequency modulating the separated luminance signal; a chrominance signal processor, including a color detector, for separating a chrominance signal from a video signal, and amplitude modulating the chrominance signal so as to be distributed in a low frequency band when the chrominance signal is detected by the color detector; a mixer for mixing an output of said luminance signal processor and an output of the luminance signal processor; a recording device for recording an output of the mixer on a record medium; and a frequency characteristic controller for controlling a frequency band of an output of the luminance signal processor corresponding to whether the video signal is a black-and-white signal or a chrominance signal, the frequency characteristic controller being connected between the mixer 40 and the luminance signal processor. Thus, for a color video signal, a color balance is maintained, and for a black-and-white video signal, the frequency characteristic of a video signal is controlled to provide contour resolution.

15 Claims, 3 Drawing Sheets

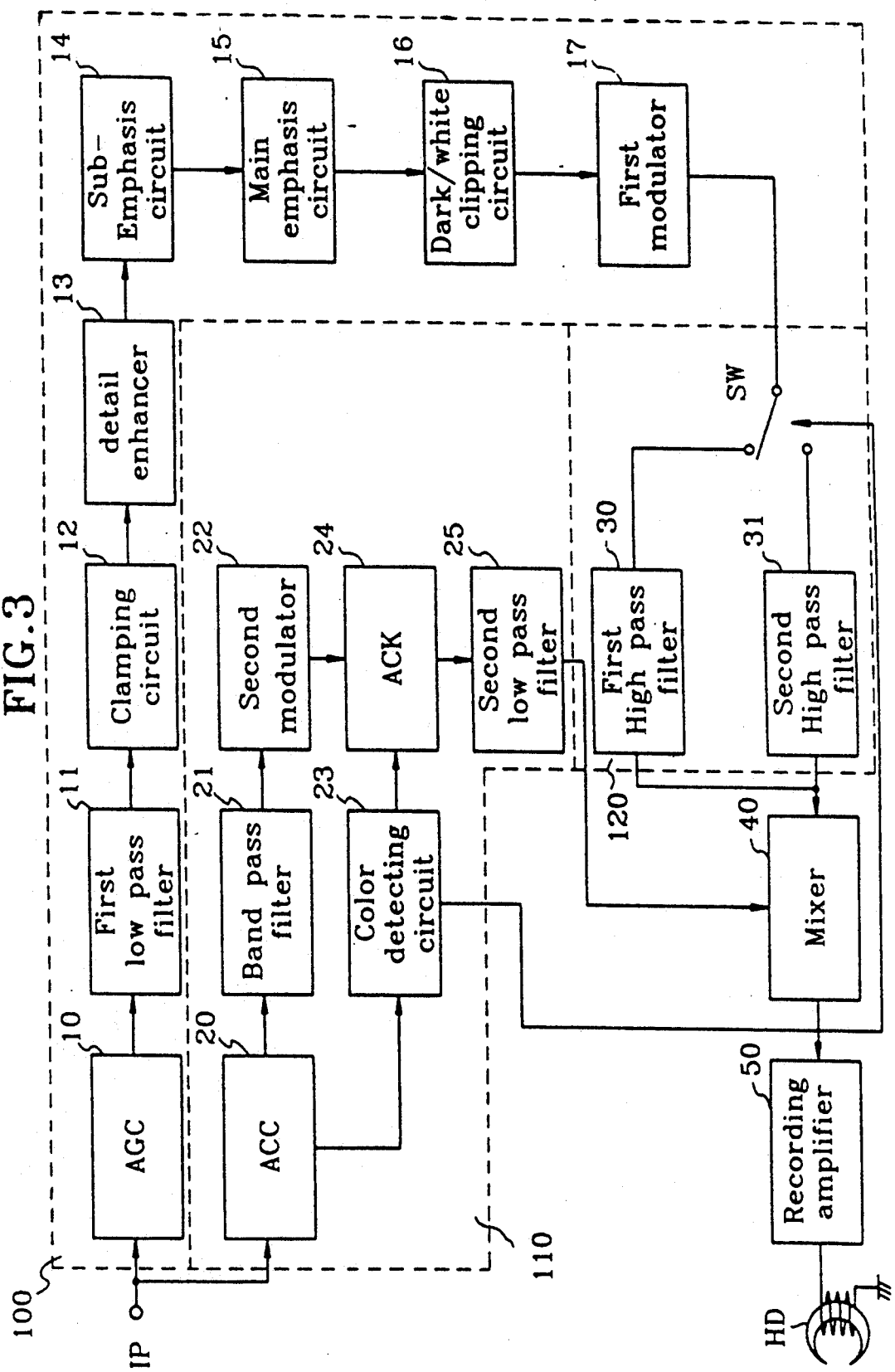

DEVICE AND METHOD IN A VIDEO RECORDER FOR CONTROLLING FREQUENCY CHARACTERISTICS OF A LUMINANCE COMPONENT IN DEPENDENCE UPON EXISTENCE OF A CHROMINANCE COMPONENT

FIELD OF THE INVENTION

The present invention relates to a video signal recording apparatus for recording video signal information on a record medium, and particularly to a video signal recording circuit to improve the image quality.

BACKGROUND OF THE INVENTION

In general, a video signal recording apparatus comprises a mechanical part for driving a record medium, a servo circuit for controlling the mechanical part, and a video signal recording circuit for treating a video signal to be proper form for being recorded on the record medium.

A conventional video signal recording circuit has a constitution of a circuit shown in FIG. 1, and the circuit shown in FIG. 1 is a video signal recording circuit for a broadcasting system of a National Television System Committee (hereinafter, referred to as NTSC). Referring to FIG. 1, an automatic gain control (hereinafter, referred to as AGC) circuit 10 which receives a video signal through an input terminal IP, automatically controls the gain of the video signal, in order to maintain a constant level of the video signal. A first low pass filter 11 detects only luminance signals distributed in the frequency band below 3 MHz among outputs of the AGC circuit 10. A clamping circuit 12 clamps a luminance signal received from the first low pass filter 11 to a predetermined level, in order to suppress the level variation of the luminance signal. A detail enhancer 13 and a sub-emphasis circuit 14 which are connected in series to the output terminal of the clamping circuit 12 emphasize a high frequency component in the band of 3 MHz to 4 MHz among the levels of the clamped luminance signal which is the output signal of the clamping circuit 12. A main emphasis circuit 15 emphasizes the output signal of the sub-emphasis circuit 14 regardless of the level. A dark-and-white clipping circuit 16 restricts the maximum white level and the reference black level of the output of the main emphasis circuit 15, for example, the maximum white level corresponds to the 200% value against the video signal level of 140 IRE, and the reference black level 45%. Further, a first modulator 17 frequency-modulates the output of the dark-and-white clipping circuit 16 with the carrier wave signal which has a central frequency of 3.4 MHz with a variation of 1 MHz, and then supplies the frequency-modulated luminance signal to a high pass filter 30. The high pass filter 30 gets rid of low frequency components of the output of the first modulator 17, and then supplies the output to a mixer 40. On the other hand, an automatic color control (hereinafter, referred to as ACC) circuit 20 maintains the level of the burst signal among video signals received through the input terminal IP. A band pass filter 21 removes frequency components except 3.58±0.5 MHz among outputs of the ACC circuit 20 and then supplies the outputs to a second modulator 22, in order to detect chrominance signals distributed in the band of 3.58±0.5 MHz, which corresponds to the luminance component removed signal among outputs of the ACC circuit 20. A second modulator 22 converts the frequency of the output of the band pass filter 21 to be an amplitude-modulated signal in a band of 629 KHz. A color detecting circuit 23 checks the existence of a chrominance signal among the outputs of the ACC circuit 20, and then generates a color detecting signal having a predetermined logic, according to the result of the check. An automatic color killer (hereinafter, referred to as ACK) circuit 24 transmits or shuts off the output of the second modulator 22 to the second low pass filter 25 according to the logic state of the color detecting signal supplied from the color detecting circuit 23. The second low pass filter 25 removes frequency components above 1.2 MHz among the outputs of the ACK circuit 24 and then supplies the outputs to the mixer 40. Then, the mixer 40 mixes the output of the second low pass filter 25 and the output of the high pass filter 30 and then supplies the mixed output to a head HD through a recording amplifier 50 and the head HD records the converted video signal, which is supplied from the mixer 40 through the recording amplifier 50, on a record medium.

If a color video signal consists of a luminance signal having a bandwidth of 0 to 3 MHz and a chrominance signal in a frequency band having a central frequency of 3.58 MHz with a deviation of 0.5 MHz, the luminance signal is frequency-modulated to have a carrier wave frequency of 3.4 MHz with a deviation of 1 MHz with respect to the video signal having a maximum white level of 140 IRE, and the color signal is low-frequency-converted to a signal the amplitude of which is modulated in a band of 629 KHz±0.5 MHz as shown in FIG. 2B. In this case, since the frequency-modulated luminance signal and the low-frequency-converted chrominance signal are overlapped at near 1 MHz as shown in FIG. 2B, both signals affect each other. The above mentioned cross talk between luminance signal and chrominance signal cause the luminance and color beat, so-called moire phenomenon, on a screen during reproducing. To prevent this phenomenon, in a conventional video signal recording circuit, low frequency components of the luminance signal around 1 MHz affecting the chrominance signal are removed by a high pass filter 30, and high frequency components of chrominance signal components around 1 MHz which affects the luminance signal around 1 MHz are removed by a second low pass filter 25. However, in the circuit of FIG. 1, if the cut-off frequency of the high pass filter 30 is shifted to a high frequency, an outline of a screen is destroyed and a horizontal resolution is deteriorated, on the contrary if the cut-off frequency is shifted to a low frequency, the above-described beat phenomenon is occurred. Furthermore, in case that a black-and-white image signal including only a luminance signal having a band 0 to 3 MHz is supplied to the input terminal IP in FIG. 2A, the black-and-white video signal is frequency-modulated as the luminance signal of the color video signal, and then filtered, so that the image of fine contour resolution can not be reproduced.

As a result, in the conventional video signal recording circuit, the color balance is not exactly balanced in a color video signal recording, and only luminance components of high frequency components are removed, so that a fine image can not be reproduced in a black-and-white signal recording.

SUMMARY OF THE INVENTION

Accordingly, it is an object of the present invention to provide a high quality video signal recording circuit, in which a color balance is exactly set in recording a color video signal, and also a fine contour resolution is achieved in recording a black-and-white signal.

To achieve the above object, the circuit according to the present invention comprises:

luminance signal processor for separating a luminance signal from a video signal and modulating the frequency of the separated luminance signal;

Chrominance signal processor, including a color detecting part, for detecting and separating a chrominance signal from a video signal and modulating the amplitude of the chrominance signal so as to be distributed in a low frequency band, when a chrominance signal is detected by the color detecting part;

a mixer for mixing an output of the frequency modulating means and an output of the low frequency converting means;

a recording device for recording the output of the mixer on a record medium; and frequency characteristic controlling means for controlling a frequency band of the output of the frequency modulating means according to kinds of video signal, the frequency characteristic controlling means being connected between the mixer ad the luminance signal processor;

the frequency characteristic controlling means maintains an exact color balance for a color video signal and a fine contour resolution for a black-and-white video signal.

BRIEF DESCRIPTION OF THE DRAWINGS

The above object and other advantages of the present invention will become more apparent by describing the preferred embodiment of the present invention with reference to the attached drawings, in which:

FIG. 3 is a circuit diagram of a preferred embodiment according to the present invention.

DETAILED DESCRIPTION OF THE INVENTION

FIG. 3 is a circuit diagram of a preferred embodiment according to the present invention, and it shows a video signal recording circuit for recording video signals of NTSC broadcasting system on a record medium.

Figure 1:
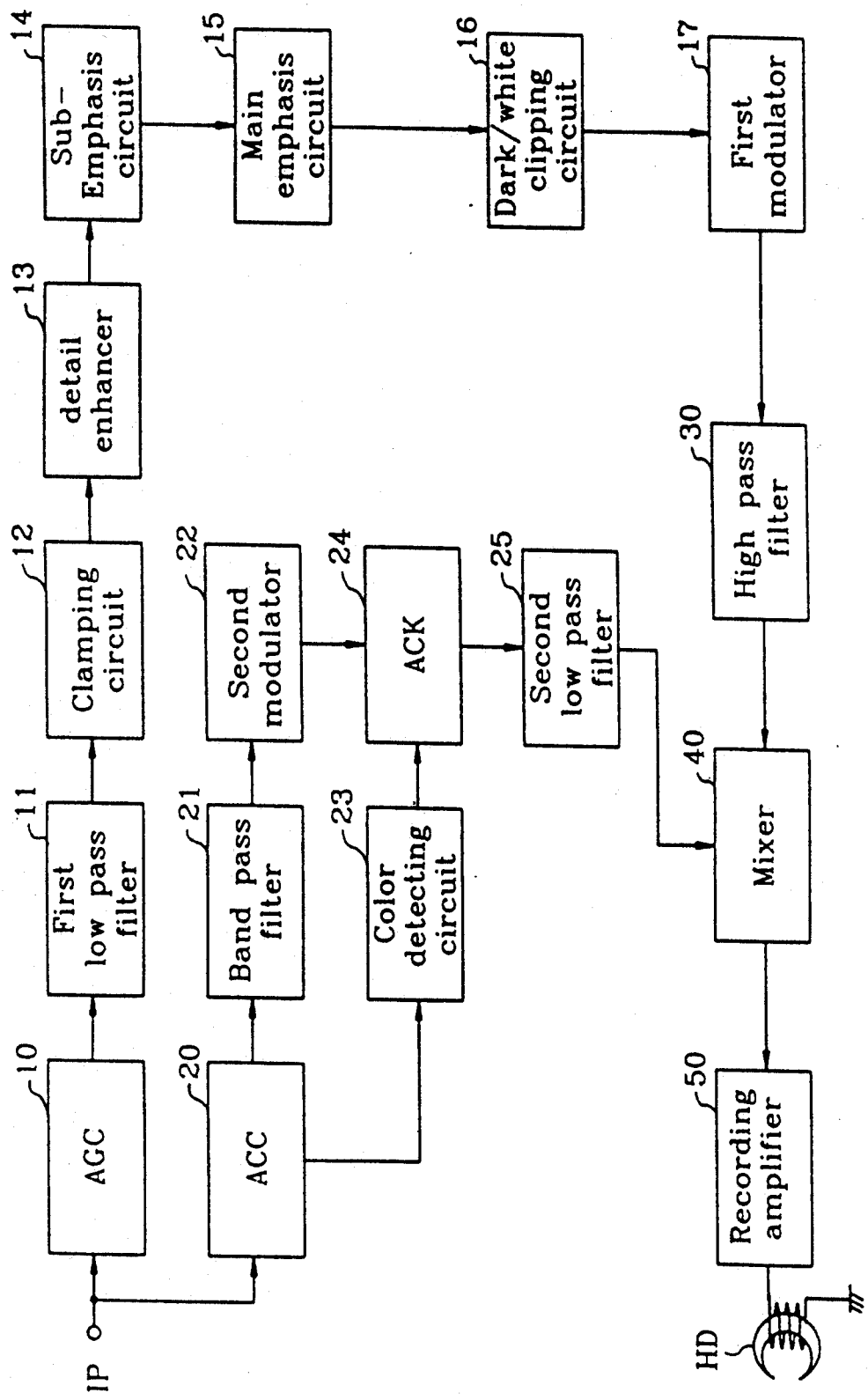
FIG. 1 is a block diagram showing a conventional video signal recording circuit.
Figure 2A:
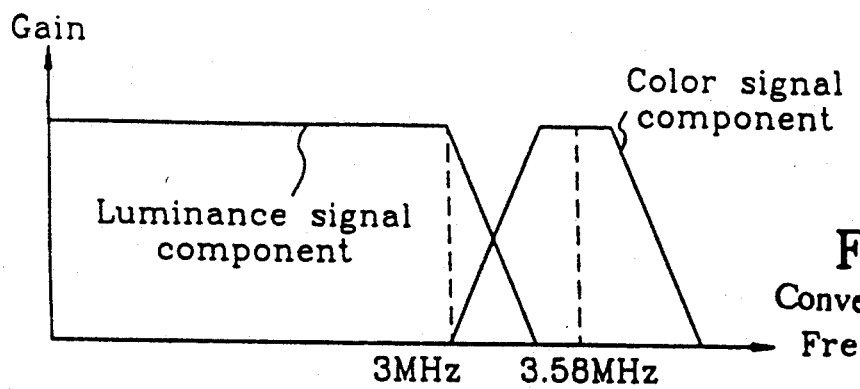
FIG. 2A and 2B are characteristic curves showing input and output signals of the circuit shown in FIG. 1.
Figure 2B:
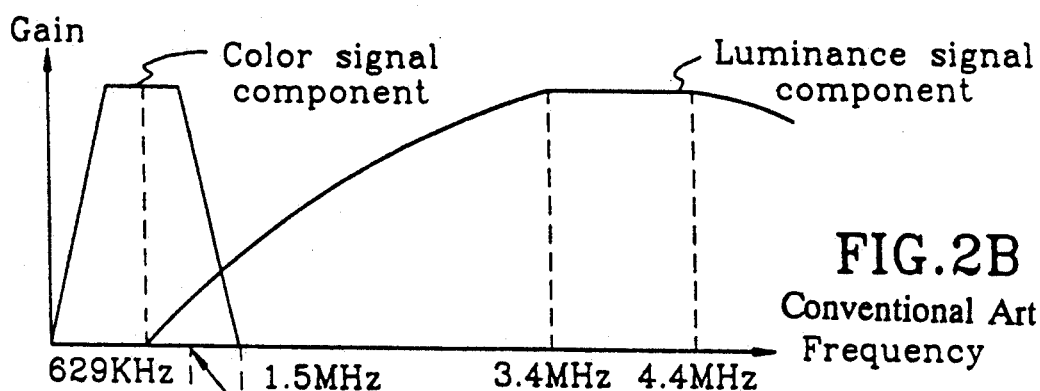

A luminance signal processor 100, in which parts corresponding to those described above with reference to FIG. 1 are identified by the same reference numerals, comprises an AGC circuit 10, a first low pass filter 11, a clamping circuit 12, a detail enhancer 13, a sub-emphasis circuit 14, a main emphasis circuit 15, a dark/-white clipping circuit 16, and a first modulator 17.

A chrominance signal processor 110, in which parts corresponding to those described above with reference to FIG. 1 are identified by the same reference numerals, comprises an ACC circuit 20, a band pass filter 21, a second modulator 22, a color detecting circuit 23, an ACK circuit 24, and a second low pass filter 25.

Further, frequency characteristic controlling means 120 consists of a first high pass filter 30 and a second high pass filter 31, which are connected in parallel between a mixer 40 and the luminance signal processor 100, and a controlling switch SW for selectively supplying an output of the luminance signal processor 100 to the first high pass filter 30 or to the second high pass filter 31 in response to a second color detecting signal of the color detecting circuit 23, the controlling switch SW being connected between the luminance signal processor 100 and the first and a second high pass filters 30 and 31.

A head HD is connected to an output terminal of the mixer 40 via a recording amplifier 50.

Figure 4A:
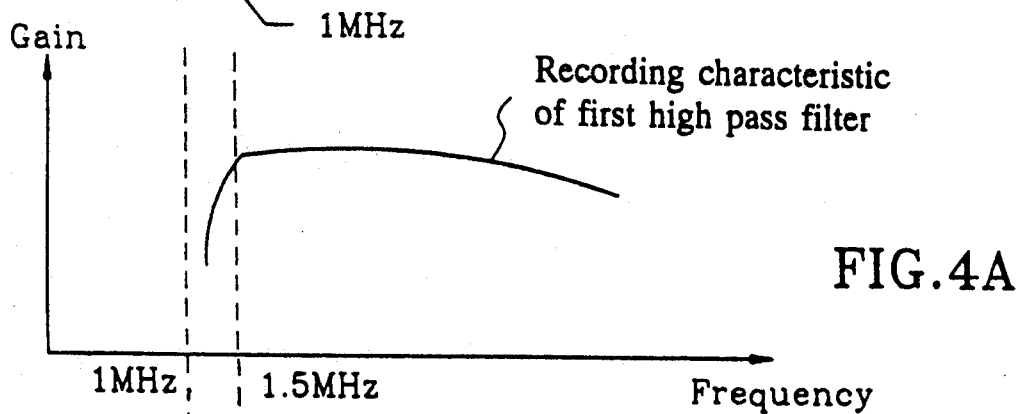
FIG. 4A and 4B are characteristic curves showing output characteristics of frequency characteristic controlling means of the circuit shown in FIG. 3.
Figure 4B:
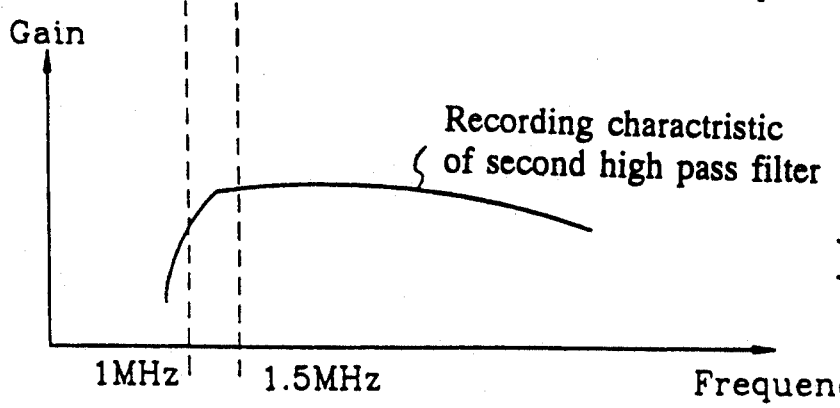

FIGS. 4A and 4B are characteristic curves of an output frequency of the characteristic controlling means 120 of the circuit shown in FIG. 3, in particular FIG. 4A corresponds to the first high pass filter 30, and FIG. 4B to the second high pass filter 31.

Operations of the circuit shown in FIG. 3 will now be described in detail with reference to FIG. 4A and FIG. 4B.

In the luminance signal processor 100, only luminance signals are separated from video signals received via an input terminal IP, and are frequency-modulated, then are supplied to the controlling switch SW. In the chrominance signal processor 110, chrominance signals are separated from video signals received via an input terminal IP, and are amplitude-modulated to have low frequencies, then are supplied to the mixer 40.

The color detecting circuit 23 of the chrominance signal processor 110 checks the existence of the chrominance signal among outputs of the ACC circuit 20, and then a color detecting signal as a logic signal is supplied to the controlling switch SW. As the detailed operation of the chrominance signal processor 110 and the luminance signal processor 100 are similar to the description related to FIG. 1, repeated descriptions will be omitted.

The frequency characteristic controlling means 120 controls is a low cut-off frequency of a modulated luminance signal, which is the output of the luminance signal processor 100, according to the logic state of a color detecting signal supplied from the color detecting circuit 23 of the low chrominance signal processor 110, and then transmits the controlled signal to the mixer 40. In more detail, when the second color detecting signal supplied from the color detecting circuit 23 has a logic state showing that the color video signal is supplied to the input terminal IP, the controlling switch SW transmits the output of the luminance signal processor 100 to the first high pass filter 30, and in the other case, i.e. when the second color detecting signal supplied from the color detecting circuit 23 has a logic state showing that a black-and-white video signal is supplied to the input terminal IP, the controlling switch SW transmits the output of the luminance signal processor 100 to the second high pass filter 31. The first high pass filter 30 filters the modulated luminance signal supplied via the controlling switch SW, and then transmits only a frequency-modulated luminance signal above a cut-off frequency of 1.5 MHz to the mixer 40 in order to prevent the interference with a low-frequency-converted signal as shown in FIG. 4A. When there is no chrominance signal in the video signal, the frequency-modulated luminance signal is input via the controlling switch SW, and the second high pass filter 31 transmits only a frequency-modulated luminance signal above the cut-off frequency of 1 MHz to the mixer 40, in order to expand a frequency band of the frequency-modulated luminance signal to near 1 MHz which is a frequency region of a chrominance signal to be low-frequency-converted. Resultantly, the output signal of the second high pass filter 31 has the frequency characteristic above the cut-off frequency of 1 MHz as shown in FIG. 4B. The mixer 40 mixes the output of the frequency characteristic controlling means 120 and the output of the chrominance signal processor 110, and then records it on a record medium via a recording amplifier 50 and a recording head HD.

As a result, when a color video signal is input to an input terminal IP, the frequency characteristic controlling means 120 gets rid of frequency components lower than 1.5 MHz among the outputs of the luminance signal processor 100, so that a mutual interference between the frequency modulated luminance signal and the low-frequency-converted chrominance signal is prevented to remove a beat phenomenon of a picture. On the contrary, when a black-and-white video signal is input to the input terminal IP, the frequency characteristic controlling means 120 expands the output of the luminance signal processor means 100 to a frequency band of a low-frequency-converted chrominance signal so as to reproduce a fine contoured picture.

As described above, according to the present invention, a low cut-off frequency of a luminance signal is controlled by the existence of color video signal, so that the interference between a low frequency-converted chrominance signal and a frequency-modulated luminance signal is prevented to maintain a color balance for a color video signal, and a frequency band of a frequency-converted luminance signal is extended to a band of a low-frequency-converted chrominance signal so as to reproduce in a fine contour resolution for a black-and-white video signal.

What is claimed is:

1. A video recording circuit comprising:
   luminance signal processing means for providing a processed luminance component by separating a luminance component from a video signal and frequency modulating said separated luminance component;
   chrominance signal processing means, comprising color detecting means for generating first and second color detecting signals indicating when a chrominance component exists in the video signal, for providing a processed chrominance component by separating the chrominance component from the video signal, and amplitude modulating said separated chrominance component for distribution in a low frequency band in dependence upon the first color detecting signal indicating that the chrominance component exists;
   frequency characteristic controlling means for providing, in dependence upon the second color detecting signal, said luminance component being one of a color luminance component with a first frequency band when the chrominance component exists and a black-and-white luminance component with a second frequency band when the chrominance component does not exist, by controlling frequency characteristics of the processed luminance component, said frequency characteristic controlling means comprising:
   a first high pass filter corresponding to the first frequency band to provide the color luminance component, and a second high pass filter corresponding to the second frequency band to provide the black-and-white luminance component, respectively connected in parallel between a mixing means and said luminance signal processing means and having different low cut-off frequencies, and
   selecting means, connected between said first and second high pass filters and said luminance signal processing means, for selecting one of said first high pass filter when the chrominance component exists, and said second high pass filter when the chrominance component does not exist, in dependence upon said second color detecting signal;
   said mixing means for producing a mixed signal by mixing the processed chrominance component and said one of the color luminance component and the black-and-white luminance component; and recording means for recording said mixed signal on a record medium.

2. The circuit as claimed in claim 1, wherein said selecting means comprises a switch.

3. The circuit as claimed in claim 1, wherein a low cut-off frequency of said first high pass filter is one of a frequency equal to a high cut-off frequency of the processed chrominance component and a frequency greater than the high cut-off frequency of the processed chrominance component, and a low cut-off frequency of said second high pass filter is less than the high cut-off frequency of said processed chrominance component.

4. A process of a video recorder for recording a video signal onto a record medium, said process comprising the steps of:
   separating a luminance component from the video signal;
   frequency modulating said separated luminance component;
   when a chrominance component is detected by a color detecting means, separating said chrominance component from said video signal, and amplitude modulating said separating chrominance component for distribution in a low frequency band;
   selecting a frequency band of said modulated luminance component, said selecting step comprising the sub-steps of:
   first high pass filtering the modulated luminance component, corresponding to a first frequency band, to provide the frequency-selected modulated luminance component when the chrominance component is detected, and
   second high pass filtering the modulated luminance component, corresponding to a second frequency band, to provide the frequency-selected modulated luminance component when the chrominance component is not detected;
   mixing said frequency-selected modulated luminance component with said modulated chrominance component to produce a mixed signal; and
   recording said mixed signal on a record medium.

5. The process of claim 4, wherein the step of selecting a frequency band comprises:
   when the chrominance component is detected by said color detecting means, providing said modulated luminance component to a first high pass filter with a first low cut-off frequency; and
   when the chrominance component is not detected by said color detecting means, providing said modulated luminance component to a second high pass filter with a second low cut-off frequency.

6. The process of claim 5, wherein said second low cut-off frequency is less than said first low cut-off frequency.

7. The process of claim 5, wherein said first low cut-off frequency is one of greater than a high cut-off frequency of said modulated chrominance component and equal to the high cut-off frequency of said modulated chrominance component, and said second low cut-off frequency is less than the high cut-off frequency of said modulated chrominance component.

8. A video recorder, comprising:
   luminance signal processing means for providing a processed luminance component by separating a luminance component from a video signal and frequency modulating said separated luminance component;
   color detecting means for generating first and second color detecting signals indicating when a chrominance component exists in the video signal;
   chrominance signal processing means for providing a processed chrominance component by separating the chrominance component from the video signal and amplitude modulating said separated chrominance component for distribution in a low frequency band, in dependence upon the first color detecting signal;
   frequency characteristic controlling means for providing, in dependence upon the second color detecting signal, said luminance component being one of a color luminance component with a first frequency band and a black-and-white luminance component with a second frequency band, by controlling frequency characteristics of the processed luminance component, said frequency characteristic controlling means comprising:
      a first high pass filter corresponding to the first frequency band, having a first low cut-off frequency,
      a second high pass filter corresponding to the second frequency band, having a second low cut-off frequency, wherein said second cut-off frequency is less than said first cut-off frequency, and
      switching means for connecting the processed luminance component to one of said first high pass filter and said second high pass filter, in dependence upon said second color detecting signal;
   mixing means for producing a mixed signal by mixing the processed chrominance component and said one of the color luminance component and the black-and-white luminance component; and
   means for recording the mixed signal on a record medium.

9. The video recorder of claim 8, wherein the first low cut-off frequency is one of a frequency greater than a high cut-off frequency of the processed chrominance component and a frequency equal to the high cut-off frequency of the processed chrominance component, and the second low cut-off frequency is less than the high cut-off frequency of the processed chrominance component.

10. The video recorder of claim 8, wherein said switching means connects the processed luminance component to the first high pass filter in dependence upon the second color detecting signal indicating that the chrominance component exists.

11. The video recorder of claim 8, wherein said switching means connects the processed luminance component to the second high pass filter in dependence upon the second color detecting signal indicating that the chrominance component does not exist.

12. A process of a video recorder for recording a video signal onto a record medium, said process comprising the steps of:
   in a luminance signal processor, separating a luminance component from the video signal and frequency modulating said separated luminance component;
   in a chrominance signal processor, detecting and separating a chrominance component from said video signal and providing a color detecting signal in a color detecting circuit indicating when the chrominance component exists, and amplitude modulating said chrominance component for distribution in a low frequency band when the color detecting signal indicates that the chrominance component exists;
   selecting a frequency band of said modulated luminance component in a frequency characteristic controller in dependence upon the color detecting signal by selecting one of:
      a first high pass filter for filtering the modulated luminance component having a first low cut-off frequency corresponding to one of a frequency greater than a high cut-off frequency of the modulated chrominance component and a frequency equal to the high cut-off frequency of the modulated chrominance component, when the color detecting signal indicates that the chrominance component exists, and
      a second high pass filter for filtering the modulated luminance component having a second low cut-off frequency corresponding to a frequency less than the high cut-off frequency of the modulated chrominance component, when the color detecting signal indicates that the chrominance component does not exist;
   mixing said frequency-selected modulated luminance component with said modulated chrominance component in a mixer to produce a mixed signal; and
   recording said mixed signal on the record medium, using a recording head.

13. A video recording circuit, comprising:
   means for determining if a video signal has as chrominance component by detecting the chrominance component and for providing a color detection signal when the chrominance component is detected;
   means for providing the chrominance component from the video signal by separating the chrominance component from the video signal and for providing a luminance component from the video signal by separating the luminance component from the video signal;
   means for providing an amplitude modulated chrominance component by amplitude modulating the separated chrominance component;
   means for providing a frequency modulated luminance component by frequency modulating the separated luminance component;
   means for producing a filtered frequency modulated signal component by filtering the frequency modulated luminance component in dependence upon the color detecting signal, said producing means comprising:

a first high pass filter for filtering the frequency modulated luminance component having a first low cut-off frequency corresponding to one of a frequency greater than a high cut-off frequency of the amplitude modulated chrominance component and a frequency equal to the high cut-off frequency of the amplitude modulated chrominance component, when the color detecting signal indicates that the chrominance component exists, and a second high pass filter for filtering the frequency modulated luminance component having a second low cut-off frequency corresponding to a frequency less than the high cut-off frequency of the amplitude modulated chrominance component, when the color detecting signal indicates that the chrominance component does not exist;

means for providing a mixed signal by mixing the filtered frequency modulated luminance component and the amplitude modulated chrominance component; and means for storing the mixed signal by recording the mixed signal on a record medium.

14. A process of recording a video signal, comprising the steps of:

providing a processed luminance component by separating a luminance component from the video signal and frequency modulating said separated luminance component;

generating first and second color detecting signals which indicate when a chrominance component exists in the video signal;

providing a processed chrominance component by separating the chrominance component from the video signal and amplitude modulating said separated chrominance component for distribution in a low frequency band in dependence upon the first color detecting signal indicating that the chrominance component exists;

producing, in dependence upon the second color detecting signal, one of a color luminance component with a first frequency band when the chrominance component exists and a black-and-white luminance component with a second frequency band when the chrominance component does not exist, by controlling frequency characteristics of the processed luminance component, said producing step comprising the sub-steps of:

first high pass filtering the processed luminance component, corresponding to the first frequency band, to provide the color luminance component when the second color detecting signal indicates that the chrominance component exists; and second high pass filtering the processed luminance component, corresponding to the second frequency band, to provide the black-and-white luminance component when the second color detecting signal indicates that the chrominance component does not exist;

providing a mixed signal by mixing the processed chrominance component and said one of the color luminance component and the black-and-white luminance component; and recording said mixed signal on a record medium.

15. The process of claim 14, wherein a low cut-off frequency of said first high pass filtering step is one of a frequency equal to a high cut-off frequency of the processed chrominance component and a frequency greater than the high cut-off frequency of the processed chrominance component, and a low cut-off frequency of said second high pass filtering step is less than the high cut-off frequency of said processed chrominance component.

* * * * *

UNITED STATES PATENT AND TRADEMARK OFFICE
CERTIFICATE OF CORRECTION

PATENT NO. : 5,245,439
DATED : 14 September 1993
INVENTOR(S) : Cheol-min Kim It is certified that error appears in the above-identified patent and that said Letters Patent is hereby corrected as shown below:

Column 3,

Line 24,      change "ad" to --and--;

Line 38,      change "FIG." to --FIGS.--;

Column 4,

Line 9,      before "head", insert --recording--;

// UNITED STATES PATENT AND TRADEMARK OFFICE
CERTIFICATE OF CORRECTION

PATENT NO. : 5,245,439
DATED : September 14, 1993
INVENTOR(S) : Cheol-min Kim

It is certified that error appears in the above-indentified patent and that said Letters Patent is hereby corrected as shown below:

Column 6, line 14, after "component; and", insert a new paragraph.

Signed and Sealed this

Sixteenth Day of August, 1994

BRUCE LEHMAN

*Attesting Officer*     *Commissioner of Patents and Trademarks*